United States Patent [19]

Fogg

[11] Patent Number: 4,960,559
[45] Date of Patent: Oct. 2, 1990

[54] CAPTURE ROW STORAGE TRAY FOR HOLDING COLLATED ROWS OF NUCLEAR FUEL PELLETS

[75] Inventor: James L. Fogg, Columbia, S.C.

[73] Assignee: Westinghouse Electric Corp., Pittsburgh, Pa.

[21] Appl. No.: 353,304

[22] Filed: May 17, 1989

[51] Int. Cl.$^5$ ............................................. G21C 21/00
[52] U.S. Cl. .................................... 376/261; 206/443; 206/565
[58] Field of Search ................. 376/261, 260; 206/443, 206/557–565; 53/148, 169, 247, 532, 542; 220/22, 22.5; 414/146; 410/42, 47; 211/60.1

[56] References Cited

U.S. PATENT DOCUMENTS

| | | | |
|---|---|---|---|
| 2,690,733 | 10/1954 | Eger | 206/557 |
| 3,270,877 | 9/1966 | Hecker | 206/564 |
| 3,581,929 | 6/1971 | Gurnard et al. | 220/22 |
| 3,907,123 | 9/1975 | Howell | 53/531 |
| 4,109,788 | 8/1978 | Hirose et al. | 206/329 |
| 4,158,601 | 6/1979 | Gerkey | 376/261 |
| 4,560,462 | 12/1985 | Radford et al. | 376/261 |
| 4,748,798 | 6/1988 | Udaka et al. | 376/261 |
| 4,849,156 | 7/1989 | Durow et al. | 376/261 |
| 4,894,201 | 1/1990 | Ahmed | 376/261 |

FOREIGN PATENT DOCUMENTS 61-4999  6/1984  Japan .

Primary Examiner—Daniel D. Wasil

[57] ABSTRACT

A capture row storage tray for holding rows of nuclear fuel pellets includes an array of laterally spaced elongated guide members extending parallel to one another, and stiffening members attached to the guide members for mounting them in the array. Pairs of adjacent guide members define elongated channels therebetween which extend parallel to one another. Each channel is open at one end for receiving a plurality of nuclear fuel pellets therethrough. The adjacent guide members of each pair have laterally spaced bottom portions attached to the stiffening members, laterally spaced and converging side portion with inclined surfaces for confining the pellets in the channel and for guiding and supporting the pellets into and at an end-to-end aligned relationship within the channel, and laterally spaced top portions which define an elongated open slot of a width less than the diameter of the pellets for capturing the pellets in the channel. The slot is located above and aligned with the pellets when in their end-to-end aligned relationship within the channel for permitting entry into the channel through the slot of a member for engaging the pellets to cause slidable movement thereof along the channel.

23 Claims, 4 Drawing Sheets

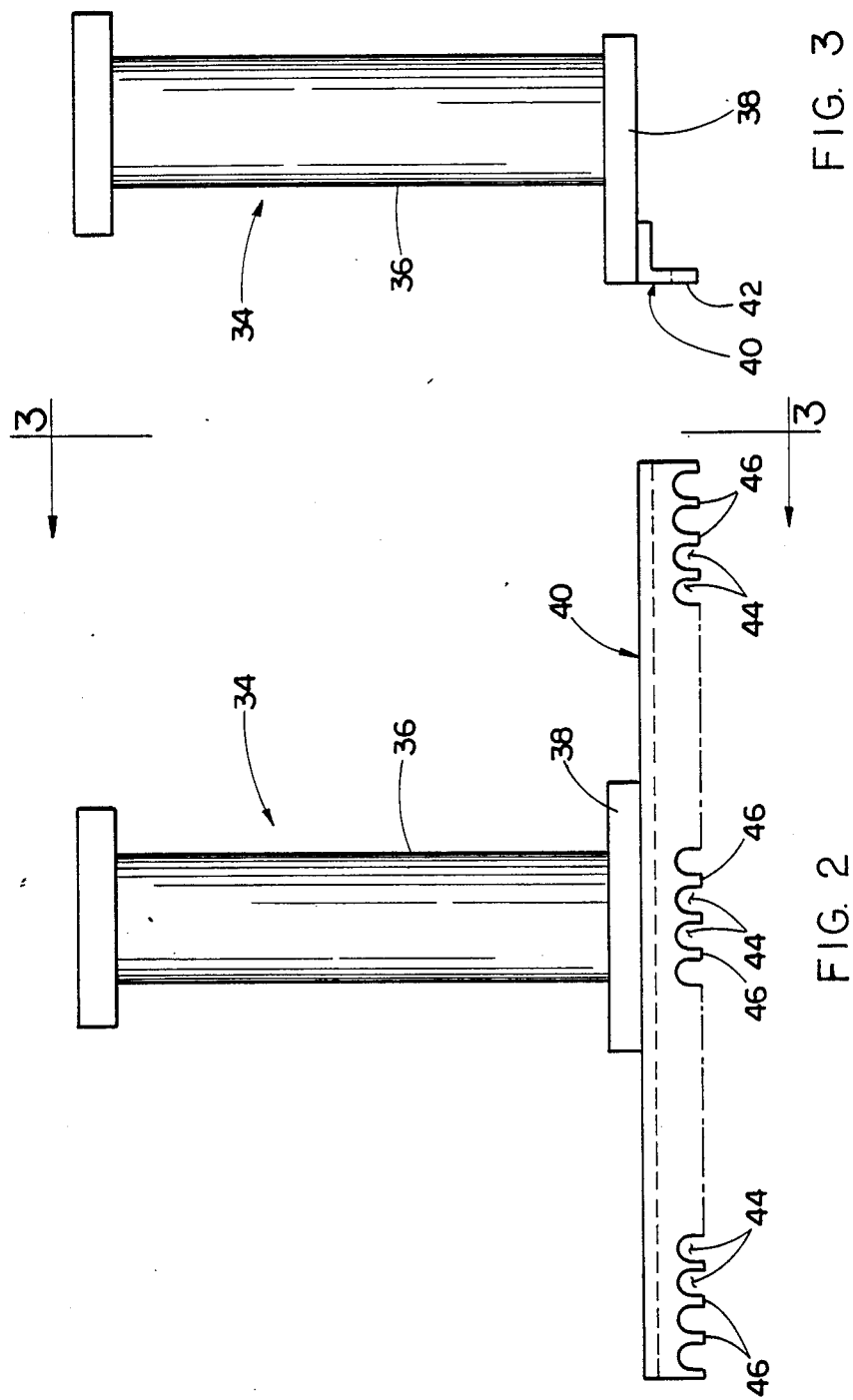

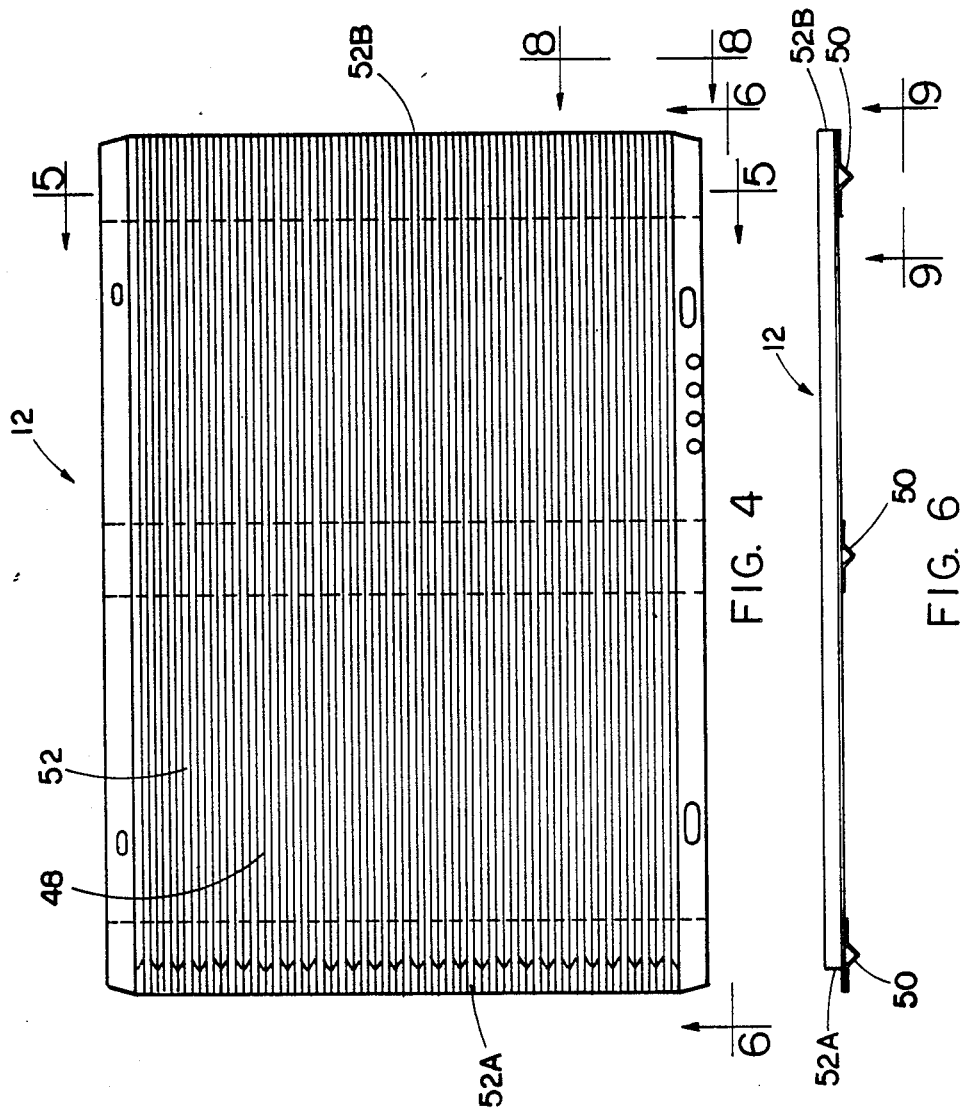

CAPTURE ROW STORAGE TRAY FOR HOLDING COLLATED ROWS OF NUCLEAR FUEL PELLETS

CROSS REFERENCE TO RELATED APPLICATION

Reference is hereby made to the following copending application dealing with related subject matter and assigned to the assignee of the present invention: "Nuclear Fuel Pellet Collating System" by Stuart L. Rieben et al, assigned U.S. Ser. No. 172,827 and filed Mar. 25, 1988, (W.E. 54,169), now U.S. Pat. No. 4,842,808.

BACKGROUND OF THE INVENTION

1. Field of the Invention

The present invention relates generally to assembling nuclear fuel pellets in multiple enrichment zones and, more particularly, is concerned with a capture row storage tray for holding assembled and collated rows of nuclear fuel pellets without the risk of inadvertently causing pellet displacement or misorientation.

2. Description of the Prior Art

In a typical nuclear reactor, the reactor core includes a large number of elongated fuel assemblies. Conventional designs of these fuel assemblies include top and bottom nozzles with a plurality of elongated transversely spaced guide thimbles extending longitudinally between and connected at opposite ends to the nozzles and a plurality of transverse support grids axially spaced along the guide thimbles. Also, each fuel assembly is composed of a multiplicity of elongated fuel elements or rods transversely spaced apart from one another and from the guide thimbles and supported by the transverse grids between the top and bottom nozzles.

The fuel rods each contain fissile material in the form of a plurality of generally cylindrical nuclear fuel pellets maintained in a row or stack thereof in the rod. The fuel rods are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Historically, a given fuel rod was filled with nuclear fuel pellets of the same enrichment. More recently, nuclear fuel rods with pellets in multiple zones of different enrichments have been introduced. These new zoned fuel rods contain short lengths of "blanket" pellets at each end. The fuel rods additionally have pellets grouped within from three to five zones of different enrichments between the end zones of blanket pellets. Pellets for filling these enrichment-zoned fuel rods first have to be assembled into the desired sequences of enrichment zones before filling of the fuel rods can commence.

A preferred approach to assembling fuel pellets in the desired sequence of enrichment zones is exemplified by the fuel pellet collating system illustrated and described in the copending patent application cross-referenced above. The fuel pellet collating system includes a tray transfer mechanism adapted to handle and sequentially transfer supply trays of pellets of various enrichments to a pellet collating line. At the collating line, mechanisms are provided for removing pellets from the supply trays, measuring specified lengths of pellets of different enrichments, assembling them into rows of pellets having the specified sequence of enrichment zones, and then loading them onto storage trays. The tray transfer mechanism is also adapted to handle and transfer the storage trays of assembled pellets to a collated storage and transport cabinet so that pellets in the specified sequence of enrichment zones can be subsequently loaded into the fuel rods.

Because the assembled rows of pellets in the specified sequences of enrichment zones will be subsequently transferred from the storage trays in the same sequences into fuel rods, it is important that the order of the pellets in the rows thereof be preserved during transfer of the storage trays from the collating line to the storage and transport cabinet and also during transporting of the trays with the storage and transport cabinet to the location where the pellets will be loaded into fuel rods. Consequently, a need exists for a storage tray construction which will prevent inadvertent displacement or misorientation of the pellets from their desired proper sequences as the trays holding the pellets are handled and moved by mechanized equipment.

SUMMARY OF THE INVENTION

The present invention provides a capture row storage tray designed to satisfy the aforementioned needs. The capture row storage tray of the present invention is capable of holding the assembled and collated rows of nuclear fuel pellets without the risk of inadvertent pellet displacement or misorientation occurring during transfer and handling of the tray. The capture row storage tray also accommodates use of the mechanism of the pellet collating system which loads the assembled rows of pellets on the storage tray.

Accordingly, the present invention is directed to a capture row storage tray for holding rows of nuclear fuel pellets. The storage tray comprises: (*a*) an array of laterally spaced elongated guide members extending substantially parallel to one another; and (*b*) means in the form of stiffening members attached to the guide members for mounting the guide members in the array. Pairs of the guide members define elongated channels therebetween which extend substantially parallel to one another. Each channel is open at one end for receiving a plurality of nuclear fuel pellets therethrough and at least partially blocked at an opposite end for preventing passage of pellets therethrough.

The guide members of each pair have laterally spaced bottom portions attached to the stiffening members, and laterally spaced and converging side portions for confining the pellets in the channel and for guiding the pellets into an end-to-end aligned relationship within the channel. The side portions of the guide members of each pair converge from an upper maximum spacing greater than the diameter of the pellets to a lower minimum spacing less than the diameter of the pellets. Also, side portions of the guide members of each pair define respective inclined guide surfaces which slope toward one another for guiding and supporting the pellets into and at the end-to-end aligned relationship within the channel.

Further, the guide members of each pair have laterally spaced top portions which define an elongated open slot of a width less than the diameter of the pellets for capturing the pellets in the channel. Also, the slot is located above and substantially aligned with the pellets in their end-to-end aligned relationship within the channel for permitting entry into the channel through the slot of a member for engaging the pellets to cause slidable movement thereof along the channel.

Further, at least one of the guide members of one pair defining one channel is disposed adjacent to and back-to-back with at least one of the guide members of another pair defining another channel adjacent to the one channel. The side portions of the back-to-back guide members have upper walls that are disposed back-to-back and rigidly attached together and lower walls which diverge away from one another.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged elevational view of an output sweep head of the pellet collating system as seen along line 2——2 of FIG. 1.

FIG. 3 is an end elevational view of the output sweep head as seen along line 3——3 of FIG. 2.

FIG. 4 is a top plan view of the capture row storage tray of the present invention.

FIG. 5 is a cross-sectional view of the storage tray taken along line 5——5 of FIG. 4.

FIG. 6 is a side elevational view of the storage tray as seen along line 6——6 of FIG. 4.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Pellet Collating System

Figure 1:
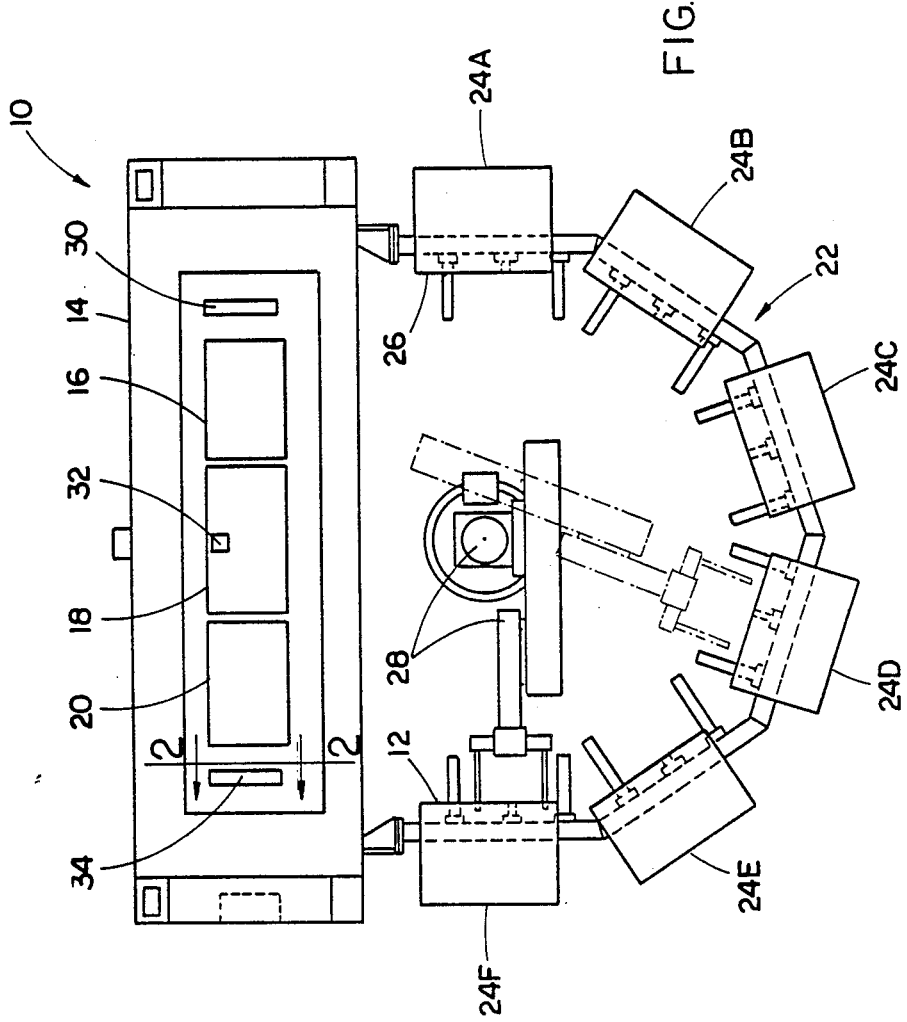
FIG. 1 is a plan view of a pellet collating system used for collating nuclear fuel pellets into rows of multiple enrichment zones and which employs the capture row storage tray of the present invention.

Referring now to the drawings, and particularly to FIG. 1, there is shown a pellet collating system, generally designated 10, which is operable for assembling and collating nuclear fuel pellets into rows of multiple enrichment zones and for loading the assembled and collated pellets on capture row storage trays 12 (FIGS. 4-6) for subsequent loading of the pellets into fuel rods from the storage trays. The pellet collating system 10 is described and illustrated in the above-cross referenced patent application, the disclosure of which is hereby incorporated herein by reference thereto. The main components and operation of the system 10 will be briefly described hereafter; however, for an indepth understanding of the system 10, attention is directed to the cross-reference patent application.

In its basic components, the pellet collating system 10 includes a pellet collating line 14 having pellet input, work and output stations 16-20 disposed in a serial arrangement, and a tray positioning station 22 located adjacent to the pellet collating line 10 and defining positions at which are lodged a plurality of mobile carts 24A-F. The carts 24A-D each supports a plurality of pellet supply trays 26, whereas the carts 24E-F each supports a plurality of the capture row pellet storage trays 12 of the present invention. Each of the trays 26, 12 are adapted to support or hold pellets in multiple parallel rows thereof. All of the pellets located on a given one of the supply trays 26 have the same enrichment. However, the enrichments of pellets on some of the supply trays 26 are different from on other supply trays 26 so that all of the enrichments are represented for carrying out assembling and collating of the pellets in rows having the different desired enrichment zones and then transferring them to the storage trays 12.

The pellet collating system 10 also includes a tray transfer mechanism, preferably a robot 28, located between the pellet collating line 14 and the tray positioning station 22. The robot is preferably a commercial device marketed under the trademark PUMA by Westinghouse Electric Corporation, the assignee of the present invention. The robot 28 is operable to rotate and to transfer the supply and storage trays 26, 12 one at a time between the respective carts 24A-F at the tray positioning station 22 and the respective input and output stations 16, 20.

The collating mechanisms associated with the stations of the pellet collating line 14 include an input sweep head 30, a gripping and measuring head 32 and an output sweep head 34. All of the heads 30-34 are mounted in depending relation from a superstructure (not shown) which disposes the heads above their respective input, work and output stations 16-20. The superstructure has suitable drive mechanisms which are computer-controlled and connected to the heads 30-34 for moving them individually. The input and output sweep heads 30, 34 and the gripping and measuring head 32 are each movable in three orthogonal directions, vertically toward and away from their respective stations 16-20 and horizontally in orthogonal directions along and across the respective stations.

More particularly, the output sweep head 34 illustrated in detail in FIGS. 2 and 3 is substantially identical to the input sweep head 30 so a description of the former will suffice also for the latter. The output sweep head 34 includes a vertical beam 36 having a horizontal plate 38 fixed to the lower end of the beam. The plate 38 has an elongated member 40 with a vertical depending edge portion 42. A series of recesses 44 are cut out of the vertical edge portion 42 to define a row of vertically-projecting fingers 46 being spaced apart by the same amount as the centers of adjacent rows of pellets resting on the supply and storage trays 26, 12 are spaced apart. The fingers 46 are also aligned with such centers of the pellet rows such that movements of the input and output sweep heads 30, 34 longitudinally along the respective stations can be employed to cause respective sweeping movements of the pellets in the multiple rows thereof simultaneously either from or to one supply tray 26 on the input station 16 to or from the work station 18 and from the work station 18 onto one storage tray 12 on the output station 20.

At the collating line, respective ones of the collating mechanisms 30-34 operate to remove pellets from one supply tray 26 at a time, measure specified lengths of pellets of different enrichments, assemble them into rows of pellets having the specified sequence of enrichment zones, and then loading them onto one storage tray 12 at a time. The tray transfer mechanism 28 handles and transfers the storage trays 12 holding the assembled pellets to a collated storage and transport cabinet or cart 24E, 24F so that pellets in the specified sequence of enrichment zones can be taken to where they will be subsequently loaded into the fuel rods.

Capture Row Pellet Storage Tray of the Present Invention

Figure 7:
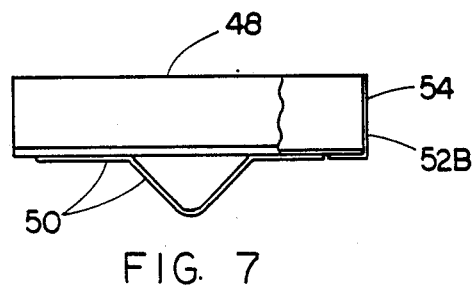
FIG. 7 is an enlarged view of the encircled right end portion of the storage tray of FIG. 6.
Figure 8:
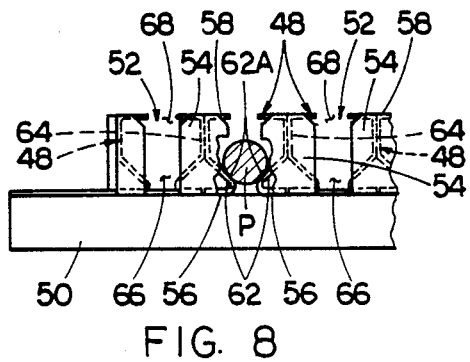
FIG. 8 is a fragmentary end elevational view of the storage tray as seen along line 8——8 of FIG. 4, with portions broken away to show a fuel pellet supported in a channel in the tray by a pair of guide members of the tray defining the channel.
Figure 11:
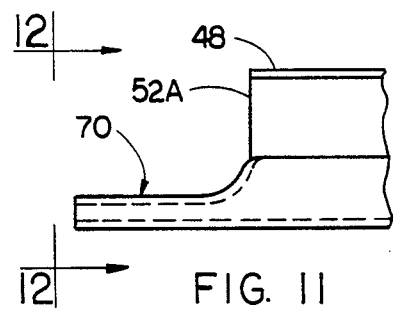
FIG. 11 is a fragmentary side elevational view of one of the guide members of the storage tray as seen along line 11——11 of FIG. 12.
Figure 10:
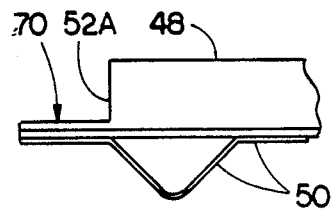
FIG. 10 is an enlarged view of the encircled left end portion of the storage tray of FIG. 6.

Referring now to FIGS. 4-13, there is illustrated in detail the capture row pellet storage tray 12 constructed in accordance with the principles of the present invention for holding the assembled and collated rows of nuclear fuel pellets (one pellet P being shown in FIG. 8) without risk of inadvertently causing pellet displacement or misorientation. In its basic components, the storage tray 12 includes an array of laterally spaced elongated guide members 48 extending parallel to one another, and a plurality of elongated reinforcing or stiffening members 50 attached to the guide members 48 for mounting them in the array. The stiffening members 50 are longitudinally spaced along the guide members 48 and extend transversely of and are rigidly connected to the undersides of the guide members 48. Pairs of the guide members 48 define elongated channels 52 therebetween which extend parallel to one another. Each channel 52 is open at one end 52A for receiving a plurality of nuclear fuel pellets therethrough, whereas spaced plates 54 are attached upright to the guide members 48 at the opposite end for blocking the channel 52 at an opposite end 52B to prevent passage of the pellets therethrough. As best seen in FIG. 8, the spacing between the upright plates 54 is sufficient to allow the fingers 46 of the output sweep head 34 to pass between them into and from the channels 52 of the tray 12. In the preferred embodiment, as seen in FIGS. 7 and 8, the spaced plates 54 are provided by a L-shaped member having its horizontal leg being attached to the underside of the guide members 48 and having a plurality of spaced apart notches defined along its vertical leg in thereby defining the spaced plates 54.

Figure 12:
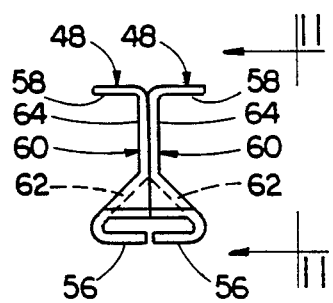
FIG. 12 is an end elevational view of back-to-back ones of the guide members as seen along line 12——12 of FIG. 11.
Figure 13:
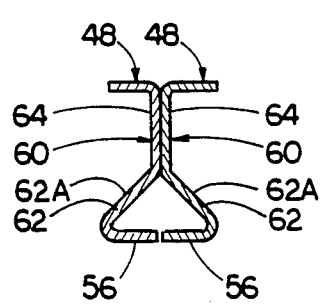
FIG. 13 is a cross-sectional view of the back-to-back guide members taken along FIG. 11.

More particularly, as best seen in FIGS. 12 and 13, the guide members 48 each have a bottom flange or portion 56, a top flange or portion 58 and a side portion 60 extending between and interconnecting the bottom and top portions 56, 58. Each guide member 48 at its bottom portion 56 is rigidly attached to the stiffening members 50 (as seen in FIG. 8). The side portion 60 of each guide member 48 is composed of a lower wall 62 and an upper wall 64. With the storage tray 26 resting in a generally horizontal orientation, the bottom and top portions 56, 58 of each guide member 48 lie in spaced horizontal planes, the lower wall 62 of the side portion 60 slopes relative to the vertical plane and the upper wall 64 of the side portion 60 lies along a vertical plane. The lower wall 62 has an inclined guide surface 62A which provides a line of contact support at one side of the cylindrical pellets.

With respect to each pair of the guide members 48 defining one of the channels 52 therebetween, their respective side portions 60 are laterally spaced apart and converge toward each other. The side portions 60 converge from an upper maximum spacing between the upper walls 64 which is greater than the diameter of the pellets to a lower minimum spacing between lower edges of the lower walls 62 which is less than the diameter of the pellets. In such configuration and spaced arrangement, the side portions 60 confine the pellets in the channel 52. Also, their oppositely inclined guide surfaces 62A guide the pellets downwardly into, and support the pellets along lines of contact at opposite sides thereof at, an end-to-end aligned relationship within the channel 52. It should be noted that the sloped configurations of the lower walls 62 of the side portions 60 will accommodate pellets within a range of different diameter sizes within the channels 52 of the tray 12. Thus, the tray 12 is not dedicated to one diameter size pellet, but can be used to hold and store pellets of different diameter sizes.

Figure 9:
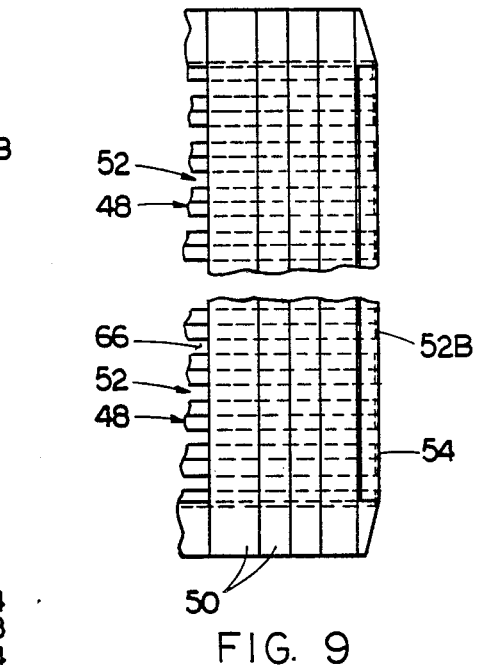
FIG. 9 is an enlarged fragmentary bottom plan view of the right end portion of the storage tray as seen along line 9——9 of FIG. 6.

Further, the bottom portions 56 of each pair of guide members 48, defining one channel 52, underlie the lower walls 62 of the respective side portions 60 and are laterally spaced apart to provide an elongated open gap 66 therebetween and along the lower edges of the lower walls 62 (see FIGS. 8 and 9). The gap 66 is of a width less than the diameter of the pellets to prevent pellets from dropping through the gap 66 and thereby assisting in capturing the pellets in the channel 52. The gap 66 is located below and generally aligned with the pellets in their end-to-end aligned relationship within the channel 52. The gap 66 permits entry of heat into the channel 52 through from below the tray 12 during a heat treatment application to the pellets as they are held in the rows thereof on the tray 12 at a subsequent station where any moisture in the pellets is removed before they are loaded into fuel rods.

Also, the top portions 58 of each pair of guide members 48 defining a given channel 52 are laterally spaced to provide an elongated open slot 68 therebetween (see FIG. 8). The slot 68 is also of a width less than the diameter of the pellets which prevents removal of pellets therethrough and thereby further assists in capturing the pellets in the channel 52. The slot 68 is located above and generally aligned with the pellets in their end-to-end aligned relationship within the channel 52. The spacing of the slot 68 between the top portions 58 is sufficient to allow the fingers 46 of the output sweep head 34 to pass between them into and from the channels 52 of the tray 12 for engaging the pellets to cause slidable movement thereof along the channel. Also, as seen in FIGS. 4, 6, 10 and 11, the open ends 52A of the channels 52 have an entry ramp 70 for facilitating sliding of the pellets into the channels 52.

As shown in FIGS. 5 and 8, but best shown in FIGS. 12 and 13, except at the opposite lateral sides of the tray 12, each of the guide members 48 of a given pair defining one channel 52 is disposed adjacent to and back-to-back with a guide member 48 of another pair defining another channel 52 adjacent to the one channel 52. The upper walls 64 of the side portions 60 of the back-to-back guide members 48 are disposed back-to-back. The edges of the bottom portions 56 are slightly spaced apart to allow the upper walls 64 to be placed flush in the back-to-back relationship and rigidly attached together, such as by brazing or welding. The inclined lower walls 62 of the side portions 60 of the back-to-back guide members 48 diverge away from one another.

It is thought that the present invention and many of its attendant advantages will be understood from the foregoing description and it will be apparent that various changes may be made in the form, construction and arrangement thereof without departing from the spirit an scope of the invention or sacrificing all of its material advantages, the form hereinbefore described being merely a preferred or exemplary embodiment thereof.

I claim:

1. A capture row storage tray for holding rows of nuclear fuel pellets, said tray comprising:
   (a) an array of laterally spaced elongated guide members extending substantially parallel to one another; and
   (b) means attached to said guide members for mounting said guide members in said array;
   (c) pairs of said guide members in said array thereof defining elongated channels therebetween extending substantially parallel to one another, each channel being open at one end for receiving a plurality of nuclear fuel pellets therethrough;
   (d) said guide members of each pair having laterally spaced apart and converging side portions for confining the pellets in said channel and for guiding the pellets into an end-to-end aligned relationship within said channel;
   (e) said guide members of each pair having laterally spaced top portions which define an elongated open slot of a width less than the diameter of the pellets for capturing the pellets in said channel, said slot being located above and substantially aligned with the pellets in their end-to-end aligned relationship within said channel for permitting entry into said channel through said slot of a member for engaging the pellets to cause slidable movement thereof along said channel.

2. The storage tray as recited in claim 1, further comprising:
   means attached to said guide members at the other end of said channels for blocking said opposite channel ends to prevent passage of the pellets therethrough.

3. The storage tray as recited in claim 2, wherein said blocking means are spaced plates.

4. The storage tray as recited in claim 1, wherein said side portions of said guide members of each pair converge from an upper maximum spacing greater than the diameter of the pellets to a lower minimum spacing less than the diameter of the pellets.

5. The storage tray as recited in claim 1, wherein said side portions of said guide members of each pair include respective lower walls which slope toward one another and define inclined guide surfaces for guiding and supporting the pellets into and at said end-to-end aligned relationship within said channel.

6. The storage tray as recited in claim 4, wherein said side portions of said guide members of each pair include respective upper walls which extend substantially parallel to one another and interconnect said lower walls and said top portions of said guide members.

7. The storage tray as recited in claim 6, wherein said guide members of one pair defining one channel are disposed adjacent to and back-to-back with said guide members of other pairs defining other channels adjacent to said one channel.

8. The storage tray as recited in claim 7, wherein said upper walls of said side portions of said back-to-back guide members are disposed back-to-back.

9. The storage tray as recited in claim 8, wherein said back-to-back upper walls are rigidly attached together.

10. The storage tray as recited in claim 7, wherein said lower walls of said side portions of said back-to-back guide members diverge away from one another.

11. The storage tray as recited in claim 1, wherein said top portions of said guide members of each pair define therebetween an elongated open slot of a width less than the diameter of the pellets for capturing the pellets in said channel, said slot being located above and substantially aligned with the pellets in their end-to-end aligned relationship within said channel for permitting entry into said channel through said slot of the member for engaging the pellets to cause slidable movement thereof along said channel.

12. The storage tray as recited in claim 1, wherein said guide members of each pair further have laterally spaced bottom portions attached to said mounting means and which define an elongated open gap of a width less than the diameter of the pellets for capturing the pellets in said channel, said gap being located below and substantially aligned with the pellets in said end-to-end aligned relationship within said channel for permitting entry of heat into said channel through said gap from below said guide members during a subsequent heat treatment application to the pellets while held in the rows thereof on said tray.

13. The storage tray as recited in claim 1, wherein said guide members of one pair defining one channel are disposed adjacent to and back-to-back with said guide members of other pairs defining other channels adjacent to said one channel.

14. The storage tray as recited in claim 1, wherein said mounting means includes a plurality of elongated longitudinally spaced reinforcing members extending transversely of and connected to the undersides of said guide members.

15. A capture row storage tray for holding rows of nuclear fuel pellets, said tray comprising:
   (a) an array of laterally spaced elongated guide members extending substantially parallel to one another; and
   (b) means attached to said guide members for mounting said guide members in said array;
   (c) pairs of said guide members in said array thereof defining elongated channels therebetween extending substantially parallel to one another, each channel being open at one end for receiving a plurality of nuclear fuel pellets therethrough, said guide members having means attached thereto for blocking said channel at an opposite end to prevent passage of the pellets therethrough;
   (d) said guide members of each pair having laterally spaced apart and converging side portions for confining the pellets in said channel and for guiding the pellets into an end-to-end aligned relationship within said channel;

(e) said guide members of each pair having laterally spaced bottom portions attached to said mounting means and which define an elongated open gap of a width less than the diameter of the pellets for capturing the pellets in said channel, said gap being located below and substantially aligned with the pellets in their end-to-end aligned relationship within said channel for permitting entry of heat into said channel through said gap from below said guidemembers during a subsequent heat treatment application to the pellets while held in the rows thereof on said tray;

(f) said guide members of each pair having laterally spaced top portions which define an elongated open slot of a width less than the diameter of the pellets for capturing the pellets in said channel, said slot being located above and substantially aligned with the pellets in their end-to-end aligned relationship within said channel for permitting entry into said channel through said slot of a member for engaging the pellets to cause slidable movement thereof along said channel.

16. The storage tray as recited in claim 15, wherein said side portions of said guide members of each pair converge from an upper maximum spacing greater than the diameter of the pellets to a lower minimum spacing less than the diameter of the pellets.

17. The storage tray as recited in claim 15, wherein said side portions of said guide members of each pair include respective lower walls which slope toward one another and define inclined guide surfaces for guiding and supporting the pellets into and at said end-to-end aligned relationship within said channel.

18. The storage tray as recited in claim 17, wherein said side portions of said guide members of each pair include respective upper walls which extend substantially parallel to one another and interconnect said lower walls and said top portions of said guide members.

19. The storage tray as recited in claim 18, wherein said guide members of one pair defining one channel are disposed adjacent to and back-to-back with said guide members of other pair defining other channels adjacent to said one channel.

20. The storage tray as recited in claim 19, wherein said upper walls of said side portions of said back-to-back guide members are disposed back-to-back.

21. The storage tray as recited in claim 20, wherein said back-to-back upper walls are rigidly attached together.

22. The storage tray as recited in claim 19, wherein said lower walls of said side portions of said back-to-back guide members diverge away from one another.

23. The storage tray as recited in claim 15, wherein said mounting means includes a plurality of elongated longitudinally spaced reinforcing members extending transversely of and connected to the undersides of said guide members.

* * * * *